Patented June 6, 1939

2,161,201

UNITED STATES PATENT OFFICE 2,161,201

PLASTICIZER

Joseph J. Schaefer, Germantown, Pa., assignor to The Sharples Solvents Corporation, Philadelphia, Pa., a corporation of Delaware No Drawing. Application April 9, 1935, Serial No. 15,471

1 Claim. (Cl. 260—110)

This invention relates to an improvement in organic plastic compositions and in paints, varnishes, emulsions, binders, adhesives and the like formulated therefrom. More particularly the present invention pertains to the incorporation in plastic compositions or in products containing them of a new plasticizing agent having numerous advantages.

A number of types of plastic compositions are already in common use and the extent to which these compositions are finding employment is fast increasing. Among the more common types of such compositions are the cellulose derivatives including pyroxylin, viscose, acetyl cellulose, and other cellulose esters and ethers; condensation products including phenol-formaldehyde resins, glyptal-phthalic anhydride resins and urea-formaldehyde resins, and the rubber resins including rubber hydrohalides, and reaction products of rubber with stannic acid, chlorostannic acid, sulphuric acid, nitric acid, and with halogen sulphonic acid derivatives.

The latter group of plastic compounds, namely the rubber resins, have recently been receiving special attention because of their ability to resist attack by the natural elements and also by many chemical agents commonly encountered in industry. Many of these resins are quite resistant both to acids and alkalis and are also practically insoluble in aliphatic and aromatic alcohols and aliphatic hydrocarbons such as gasoline and kerosene. In addition, most of the rubber resins have very good electrical characteristics and so are especially useful where their insulating power is of importance.

With all of these desirable characteristics, however, rubber resins are generally not usable alone because they are nearly always either brittle or tend to become so upon aging. Hence it has been necessary in order to make the resins commercially desirable, to compound them with a softener or plasticizer that will overcome any inherent brittleness and prevent the resin from becoming hard and frangible upon aging. Such a plasticizer must not detract to any great extent from the chemical resistance of the resins, it must be compatible with the resins and the solvents used, it must not detract from the electrical properties of the resins and it must not evaporate from the resins and permit them to become hard and brittle upon aging.

Many of the plasticizers or softening agents already in use with cellulose derivatives have been tried with rubber resins with some success, but because of the essential differences in the chemical nature of cellulose derivatives and the rubber resins, these plasticizers have not been entirely satisfactory. This is due in some instances to lack of compatibility with the resin or the solvent, in others to a detrimental effect exerted by the softener upon the characteristics of the resin and in yet other instances to still other effects.

To overcome many of the difficulties heretofore encountered in attempting to maintain rubber resins in the desired state of plasticity, the present invention was conceived. According to the essential principle thereof it has been found that amyl naphthalenes and certain closely related compounds may be used to advantage with rubber resins, and even with other types of organic plastics, and that when properly incorporated with these plastics, but particularly with rubber resins, they produce plastic compositions of excellent quality and a plasticity of any desired degree. The plasticity so produced is substantially constant even over long periods of aging. Furthermore the new plasticizers cause no yellowing or other discoloration of the light colored varieties of the plastics even upon long aging. Drying oils have been found generally unsatisfactory as plasticizers because they cause light colored products to become yellow, particularly upon aging.

Amyl naphthalenes and many other similar compounds are commonly prepared by the reaction of either alkyl chloride or olefin material with naphthalene or other aryl compound, usually in the presence of a catalyst, such as aluminum chloride. Depending upon the proportions of alkyl and aryl radicals present, the amount of catalyst, the temperature and other conditions, the aryl nucleus may be substituted with one or more than one alkyl group, thus forming either mono-alkyl or poly-alkyl compounds, or more commonly, mixtures of mono- and various poly-alkyl products.

In the case of amyl naphthalenes, temperatures of 80 to 90° C. favor the formation of mono-amyl naphthalene while lower temperatures favor the formation of the poly-amyl compounds. For example, 854 parts by weight of naphthalene and 831 parts by weight of mixed tertiary and secondary amyl chlorides were heated together at 55° C. until they formed a homogeneous solution. Aluminum chloride was added after the solution became homogeneous, to the extent of 10 parts by weight, but in very small portions. The reaction was substantially complete by the time 8 parts had been added. The temperature was subsequently raised to 80° C. for a few minutes to insure complete reaction and the products washed with 2% hydrochloric acid, water, 5% sodium hydroxide, and then more water.

By distilling the product of this reaction, a small amount of amyl chloride was recovered and 320 parts by weight of naphthalene were found to have been left unreacted. However, there were 543 parts by weight of mono-amyl naphthalene formed and 283 parts by weight of di-amyl naphthalene. It has been found that either of these two amyl naphthalenes operate satisfactorily as a plasticizer and also that the mixture of amyl naphthalenes formed by this reaction will function very well. The poly-amyl naphthalenes are particularly desirable, however, because of their higher boiling points. The unreacted naphthalene and amyl chloride will, of course, ordinarily be removed.

Instead of following the procedure of the above example, amyl naphthalenes and other compounds contemplated by this invention may be prepared by any other method or by the use of other proportions. For instance, 1½ to 2 moles of amyl chloride may be reacted with 1 mole of naphthalene in the presence of about 6 to 7 grams of aluminum chloride at 5 to 10° C. to produce a mixture of amyl naphthalenes containing a considerable proportion not only of diamyl naphthalene but also of triamyl naphthalene.

All of the amyl naphthalenes have relatively high boiling points and are quite stable at temperatures considerably above those normally encountered, so that they do not detract from the stability of the rubber resins in that regard. The boiling points of the three better known mixtures of the isomeric amyl naphthalenes at atmospheric pressure are approximately as follows:

|  | Degrees C. |
|---|---|
| Mono-amyl naphthalene | 280 to 300 |
| Di-amyl naphthalene | 325 to 345 |
| Tri-amyl naphthalene | 370 to 390 |

Furthermore, amyl naphthalenes and similar compounds are compatible with the resins and with all of the solvents and thinners ordinarily used, including coal tar naphtha, benzene, toluene, xylene and chlorinated aliphatic hydrocarbons such as ethylene dichloride and carbon tetrachloride. Also the new plasticizers are quite stable to acid and alkali and have excellent electrical properties and thus do not substantially weaken the characteristics of the rubber resins in either of these regards.

The amyl naphthalenes have been mentioned and discussed specifically in the foregoing paragraphs because they have been found particularly suited for use with rubber resins as plasticizers. The use of other similar compounds or mixtures containing them are contemplated, however, and amyl naphthalenes or these other compounds may also be used to soften or plasticize other organic plastics, as, for instance, the cellulose derivatives.

In compounding organic plastic materials from the new plasticizers the procedure is much the same as had heretofore been used for compounding with other plasticizing materials. If the softener or plasticizing agent is to be incorporated in the material while in plastic form, the plastic material and plasticizer may be mixed and kneaded or milled together until a thoroughly homogeneous mass results. Alternatively, the plastic material may be dissolved or dispersed in a solvent, the plasticizer mixed therewith and the solvent removed by evaporation. If a paint, varnish, lacquer, or the like is to be made, the plasticizer may either be added to the dissolved plastic material in the process of formulating this product or may be incorporated by the manufacturer of the plastic in the plastic material itself, before it is shipped to the paint or varnish manufacturer.

As an example of a plastic composition suitable for making serving trays, cups, combs and the like the following formula may be given:

| | |
|---|---|
| Rubber resin (reaction product of stannic acid and rubber) parts by weight | 5 |
| Mono-amyl naphthalene do | 1 |
| Filler (zinc oxide, carbon black, red lead or the like) | As desired |

This product may also be used as a base material from which a varnish or lacquer may be prepared by the addition of suitable solvent, thinner, etc.

If the composition is to be applied by spraying or dipping it may be diluted until the resin content is reduced to around 12%. An example of such a composition is as follows:

| | Parts by weight |
|---|---|
| Rubber resin (chlorostannic acid-rubber reaction product) | 12 |
| Naphtha | 68 |
| Toluene | 17 |
| Poly-amyl naphthalenes | 3 |

From these examples it will be apparent that the amount of plasticizer will usually be in the general neighborhood of one part by weight of plasticizer to four or five parts by weight of plastic. It may, however, vary from a ratio of 1 to 3 for very soft compositions to 1 to 10 for very hard ones, or even farther. In relation to the total amount of a coating composition the amount of plasticizer may bear an even wider range of proportions. Usually around one part in twenty-five to one part in forty of plasticizer will be sufficient, but as high as one part in fifteen or higher may be used and less than one part in forty may also be found desirable in certain instances.

I claim:

A plastic composition comprising essentially a conversion product obtained by treatment of rubber with chlorostannic acid and an alkyl naphthalene in the alkyl radical of which there are at least four carbon atoms.

JOSEPH J. SCHAEFER.